Dec. 3, 1946.    E. E. TURNER, JR    2,411,911
MAGNETOSTRICTION OSCILLATOR
Filed June 18, 1941    2 Sheets-Sheet 1
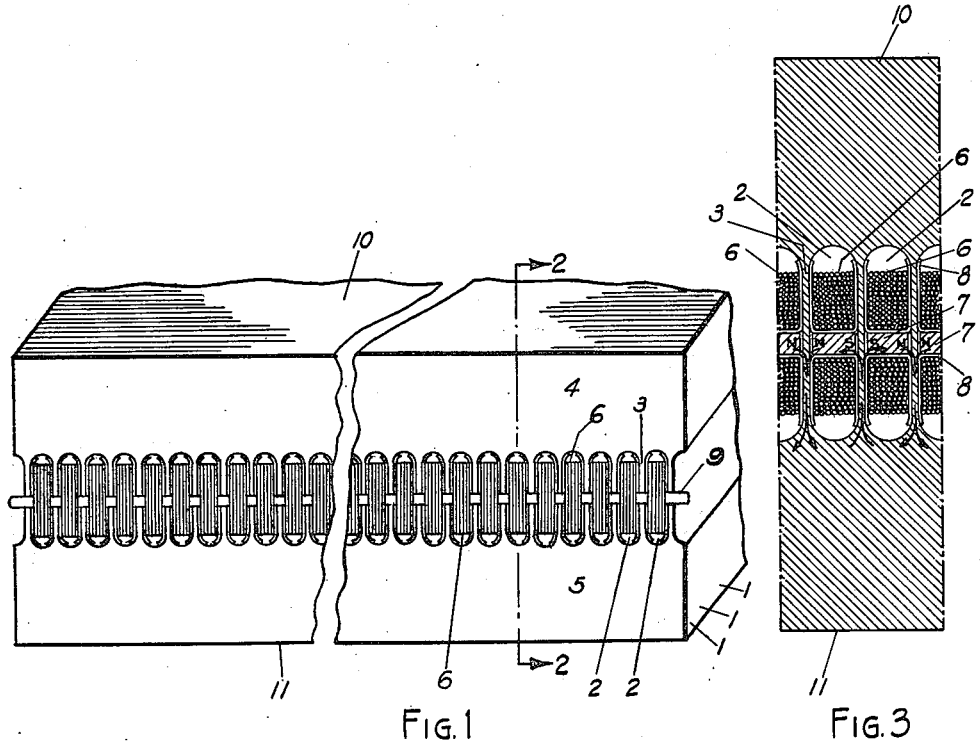
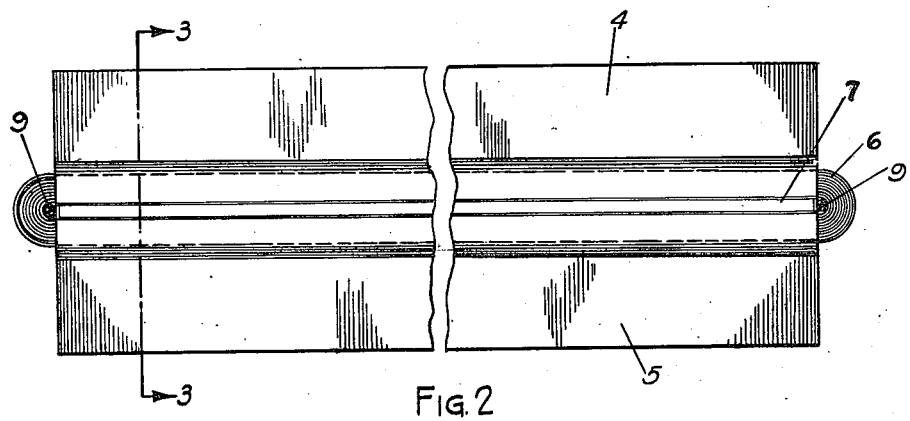
INVENTOR
EDWIN E. TURNER, JR.
BY
ATTORNEY Dec. 3, 1946.　　　　E. E. TURNER, JR　　　　2,411,911
MAGNETOSTRICTION OSCILLATOR
Filed June 18, 1941　　　2 Sheets-Sheet 2
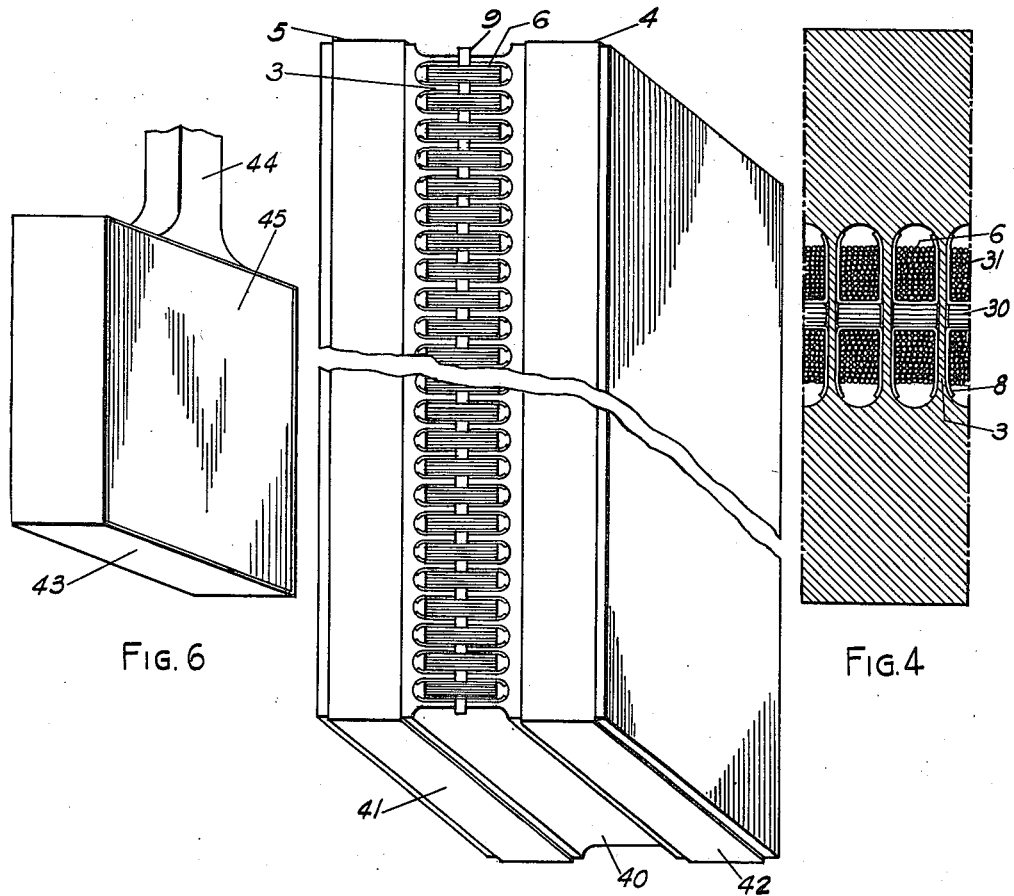
INVENTOR
EDWIN E. TURNER, JR.
BY
ATTORNEY Patented Dec. 3, 1946

2,411,911

UNITED STATES PATENT OFFICE 2,411,911

MAGNETOSTRICTION OSCILLATOR

Edwin E. Turner, Jr., West Roxbury, Mass., assignor, by mesne assignments, to Submarine Signal Company, Boston, Mass., a corporation of Delaware Application June 18, 1941, Serial No. 398,583

9 Claims. (Cl. 177—386)

The present invention relates to magnetostriction oscillators and more particularly to the type in which the magnetostriction core is polarized. The invention also applies particularly to a laminated structure.

In the use of magnetostrictive material for the production of mechanical vibratory energy it has been found that the vibrations will be produced more efficiently and uniformly, particularly in the case where nickel is used as a magnetostrictive material by having a constant magnetic flux pass through the magnetostrictive material. The varying or pulsating flux then impressed upon the nickel produces an increase and decrease in flux in the material which causes a contraction and expansion respectively of the material corresponding to the variations in flux. The polarization of the material makes it possible to operate the material at the point where the flux variations produce the maximum mechanical vibratory response.

In apparatus of this nature a common type of construction is to surround a magnetostrictive core with a coil or coils in which direct and alternating current may flow. Sometimes the currents are impressed upon the same coil and at other times separate and independent coils are used to carry the alternating and the direct current flux. Due to the fact that magnetostrictive material, which has the best magnetostrictive qualities, has comparatively low magnetic flux permeability, there is usually a great amount of flux leakage in most systems, that is to say, only a portion of the flux which is developed or could be developed is effectively made to pass through the magnetostrictive materials. In addition to this, with the use of a straight core, no return magnetic flux is provided and frequently the magnetic path is through the air in which the permeability, of course, is unity. This difficulty brings about the necessity of comparatively large magnetizing currents to produce the necessary magnetomotive forces and corresponding fluxes and therefore large resistive losses. The stray flux or leakage flux is also apt to cause hysteresis and eddy current losses, particularly in unlaminated apparatus or in the magnetic return path of flux.

In the present invention these difficulties are substantially overcome in the particular manner in which the magnetostrictive material is magnetized and in which the variable flux is impressed therein. The arrangement is such that the flux is substantially confined to the magnetostrictive element and the latter in itself furnishes a useful direct and return magnetic path, that is, the flux flows through active magnetostrictive material.

Another feature of the present invention is the use of a permanent magnet for polarizing the magnetostrictive cores, the same permanent magnet also serving as part of the flux path of the variable flux impressed by the coil bearing the alternating current.

In the present arrangement the coils lie substantially in planes parallel to the magnetostrictive vibrating elements, one coil on either side of the elements in such a way that the flux produced between the two coils is confined to the magnetostrictive member lying between the two coils.

Further advantages and merits of the present invention will be better understood from the description in the specification below describing an embodiment of the invention when studied in connection with the drawings illustrating the same in which Fig. 1 shows a fragmentary perspective of the device; Fig. 2 shows a section taken substantially on the line 2—2 of Fig. 1; Fig. 3 shows a fragmentary section taken substantially on the line 3—3 of Fig. 2 but enlarged; Fig. 4 shows a fragmentary section similar to that of Fig. 3 but of a modified form of the construction of a detail shown in Fig. 3; Fig. 5 shows a means of supporting the device; Fig. 6 shows a further modification of the support of Fig. 5; Fig. 7 shows a modification of the means for polarizing the device; and Fig. 8 shows a tank mounting.

As illustrated in Fig. 1, the oscillator is built up of a block of laminations 1, 1, 1, which may be stamped or died out in the desired form. These laminations have a group of perforations 2, 2, 2, etc., running in the direction of the width dimension although the perforations may run along the length dimension, if desired, depending upon the frequency and size the oscillator is desired to have. For higher frequencies and for directive oscillators where a beam of compressional waves is to be produced or where the oscillator is desired to have certain directive characteristics, it will usually be true that the perforations run in the direction of the width of the laminations. The material between successive perforations provides the vibrating magnetostrictive member. In each individual lamination these thin stems 3 together with the end masses 4 and 5 form an elastic vibratory system which is given the proper dimensions to produce mechanical resonance at the desired frequency. In this case the element or stem 3 provides the elastic element and the end masses, the loading masses, so that the frequency, which otherwise would be very high, can be brought down to the normal desired frequency. As an instance, with the loading as shown in the figure, the frequency of the system may be in the neighborhood of 20,000 cycles, depending, of course, on the exact kind of material used and the medium in which the device is to operate.

By stacking a group of laminations together as indicated in Fig. 1, the elastic vibratory element, which forms the partitions between the perforations in the stack, becomes the active magnetostrictive element in the oscillator. Into this thin stem must be impressed the magnetic flux flowing in the stem in the vertical direction with reference to Fig. 1. This is accomplished by the use of the construction indicated in the figures. The perforations 2 contain an elongated coil 6 positioned with its long dimension horizontally as shown in Fig. 2, and extending through the complete stack of laminations from one end to the other. Each coil occupies a single set of perforations and in its width dimension is positioned vertically, as indicated in the drawings.

At the center of the coils, which preferably are many times longer than their width, are long bars 7, 7, occupying substantially the entire space at the center portion of the elongated coils. These bars are of such a dimension that they come close to but do not touch the elements 3 so that the motion of the stems is not interfered with. These bars may come so close as can be conveniently mechanically fitted and the closer they extend to the stems, the less the leakage flux at that point will be. These bars which extend substantially between the stems 3 to 3 may be made of very efficient permanent magnetic material, as for instance, material known to the trade as "Alnico," which is an alloy of aluminum 12%, cobalt 5%, nickel 20% and iron 63%, or some such similar material which is used for very strong permanent magnets. However, as shown in Fig. 4, these bars 30 may be of iron or other suitable highly magnetic material and they may be laminated in horizontal planes, as shown in Fig. 4, to cut down eddy currents. In this case the coils 31 carry both alternating and direct current in accordance with the circuit of Fig. 7, the alternating current being supplied by the source 32 in series with a condenser 33 to block out the direct current and the direct current 34 being supplied through the choke 35 to block the alternating current from the battery.

These magnets are so arranged in the center of the coils in adjacent perforations so that the south poles oppose one another and the north poles oppose one another as indicated by the labelled letters in Fig. 3. In this construction the permanent magnetic flux divides at the center of the magnetostrictive element 3 the flux produced by the bars in adjacent coils, each operating together and each flowing in different directions in the top and bottom half of the magnetostrictive elements 3.

The variable magnetostrictive flux is produced by means of the coil 6 which impress the flux in the stems 3 in exactly the same manner as a permanent flux is impressed by the permanent magnets. In this respect any two adjacent coils through the reaction of the current flowing in the coils tend to crowd the flux in the space between the coils and therefore in the material of the stems 3. The coils should be so connected together and operated that the flux in adjacent coils produced by the alternating currents produce at the same instances magnetic poles of the same polarities opposed to one another. For instance in Fig. 3, the alternating current impressed upon the coils at one instant may be such as to produce polarity as indicated by the letters N and S. In the next half of the alternating current cycle these polarities will be reversed and those which are labelled south will become north, while those which are labelled north will become south as far as the alternating current is concerned. It will be appreciated, of course, that the direct current flux is the same at all times. Under these conditions it will follow that during one-half of the alternating current cycle, the flux flowing in the two halves of the stems 3 will increase when the alternating current polarity is the same as the direct current polarity and will decrease when the alternating current polarity is in the reverse direction to the direct current polarity. Theoretically and to a good extent practically the center of the system or the mid-point between the magnetic poles of the permanent magnet will have a balanced point in which no flux flows at all, and this point will not only be the mechanical but also the electrical node in the system. As the flux in the two halves of the stems increases, the material being of nickel will contract, while when the flux decreases, the material will expand, both halves of the stem acting always in additive phase but in opposite directions.

In connection with the actual mechanical construction of the device as illustrated, it will be noted that on both the upper and lower faces of the permanent magnet paper shells 8 are provided encasing the upper and lower long arms of the coils. This also furnishes additional protection for insulation and against friction and as a support for the permanent magnet at the central portion of the structure. The coils are held in place at their end by rods 9 which may be of "Bakelite" or other insulating material and which thread through the ends of all the coils at the ends of the permanent magnet strips or bars 7 and in front of the end laminations of the stack. These rods, therefore, not only hold the coils in place, but also hold and locate the permanent magnets in proper position.

In the structure as illustrated in the figures the construction is symmetrical in a horizontal plane and the node of the system is in a central horizontal plane as viewed in the figures. This is obtained by making the mass elements 4 and 5 equal and similar and the system itself may be called a half-wave-length system with a central node and end surfaces having equal amplitudes. As a transmitting device for producing compressional waves the oscillator may operate as a one-half wave length system in which case the end surfaces 10 and 11 are the radiating surfaces. When the unit operates as a receiver, these end surfaces are the pickup surfaces which vibrate in response to the wave motion in the medium as, for instance, a water medium. The vibrational response of these surfaces creates compression and expansion in the stems which produce variations in the magnetic flux and therefore generate a response in the coils. One or both sides of the surfaces 10 and 11 may act as the radiator or pickup element of the oscillator, and if the masses 4 and 5 are unequal, the node of the system will be changed so that more of the vibrational motion will reside in the lighter mass than in the other, although the mechanical force in this mass will be correspondingly less. This adaptation may be used where it is desired to obtain the maximum efficient operation in a heavy medium as in a water medium and is adaptable to the present system by choosing the end masses to have the desired mass ratio corresponding to the force factor and linear amplitude which it is desired that the oscillator should have in the medium.

The present device may be mounted in a perforation in the skin of a vessel for the purposes of submarine signaling, or it may be suspended in a water tank in the vessel or in some other form of liquid tank. For this purpose the oscillator may be put into a tank, or the oscillator may just fit the casing, or the strap may go around the oscillator perpendicular to the direction of oscillation of the oscillator.

These modifications are shown in Figs. 5, 6 and 8. In Fig. 5 the oscillator 40 may have two straps 41 and 42 passing around the oscillator as a belt in a plane or section perpendicular to the direction of motion. This manner of supporting the oscillator will not prevent free vibrations of the laminations. The oscillator may be held by these straps in the same manner as though the straps were the casings shown in Figs. 6 and 8.

In Fig. 6 the casing 43 may be attached to the shaft 44 which may be free to be turned. The casing 43 may be opened or closed at its back end and, as shown, the radiating face 45 may be in a vertical plane for horizontal radiation.

In Fig. 8 the oscillator 46 may be mounted in a casing 47 from which brackets 48 extend to a hub 49 supported by the tank 50. The tank 50 may be mounted against the skin 51 of the vessel and may be filled with oil 52 or other suitable sound conducting medium.

Having now described my invention, I claim:

1. A magnetostrictive oscillator of the type described comprising a stack of laminations of magnetostrictive material having perforations therethrough forming slots with thin stems therebetween, a plurality of current-conducting coils one positioned in each of said slots and a core for said coil extending between successive stems, said core being a permanent magnet, the cores and coils being so arranged that the flux of both the permanent magnets and that due to the coils always flow in opposite directions through portions of said stems.

2. A magnetostrictive oscillator comprising a stack of laminations formed of magnetostrictive material, each lamination having a plurality of uniform slots with uniform stems between the slots, the laminations being stacked together to align the slots and the stems, a plurality of current-carrying coils, one positioned in each of the aligned slots of the laminations, each of said coils having a core formed of a permanent magnet and extending between successive stems, the cores being so arranged that successive poles are of the same polarity, and said coils being energized so that adjacent coils provide in themselves the same flux polarity at the same instant of time.

3. A magnetostrictive oscillator comprising a stack of laminations formed of magnetostrictive material, each lamination having a plurality of uniform slots with uniform stems between the slots, the laminations being stacked together to align the slots and the stems, a plurality of current-carrying coils, one positioned in each of the aligned slots of the laminations, each of said coils having a core formed of a permanent magnet and extending between successive stems, the cores being so arranged that successive poles are of the same polarity, said coils being adapted to be energized by alternating current to produce similar poles opposing one another.

4. A magnetostrictive oscillator comprising a stack of laminations formed of magnetostrictive material, each lamination having a plurality of uniform slots with uniform stems between the slots, the laminations being stacked together to form aligned elongated slots and elongated stems, a plurality of current-carrying coils, one positioned in each of said aligned slots of the laminations and means for energizing said coils whereby said coils produce simultaneously poles of similar polarities opposing one another.

5. A magnetostrictive oscillator comprising a stack of laminations formed of magnetostrictive material, each lamination having a plurality of uniform slots with uniform stems between the slots, the laminations being stacked together to align the slots and stems, a plurality of current-carrying coils, one positioned in each of said slots, said coils being connected together whereby adjacent coils produce poles of similar polarity opposing one another, said poles being positioned abutting the laminations in said middle sections.

6. A magnetostrictive oscillator comprising a stack of laminations formed of magnetostrictive material, each lamination having a plurality of slots therein forming stems between the slots, said laminations being stacked together to align the slots and the stems, a plurality of current-carrying coils, one positioned in each of said slots, said coils being connected together whereby the current flowing therein produces poles of similar polarity opposing one another in adjacent coils, said poles abutting said stems between the ends of the slot.

7. A magnetostrictive oscillator comprising a stack of laminations formed of magnetostrictive material, each lamination having a plurality of slots therein forming stems between the slots, said laminations being stacked together to align the slots and stems, a plurality of current-carrying coils, one positioned in each of said slots, a core positioned in said coil and having its ends opposing the stems at the sides of the slot, said current-carrying coils being connected together to produce poles of similar polarities at opposite sides of the said stems in said slots.

8. A magnetostrictive oscillator of the type described comprising a stack of laminations formed of magnetostrictive material, each lamination having a plurality of uniform slots with uniform stems between the slots, the laminations being stacked together to align the slots and the stems and form a plurality of slots having length dimensions long as compared with the length dimensions of the slot, a plurality of elongated current-carrying coils, one positioned in each of the aligned slots of the laminations, each of said coils having as a core a permanent magnet in the form of an elongated bar running parallel to the long axis of the coil, said coils extending beyond the end laminations and providing a space between the inner side ends of the coil and said bar, and a bar passing through said spaces of each coil and abutting the face of the end of the laminations.

9. A magnetostrictive oscillator of the type described comprising a stack of laminations formed of magnetostrictive material, each lamination having a plurality of uniform slots with uniform stems between the slots, the laminations being stacked together to align the slots and the stems and form a plurality of slots having length dimensions long as compared with the length dimensions of the slot, a plurality of elongated current-carrying coils, one positioned in each of the aligned slots of the laminations, each of said coils having as a core a permanent magnet in the form of an elongated bar running parallel to the long axis of the coil, said coils extending beyond the end laminations and providing a space between the inner side ends of the coil and said bar, and a bar passing through said spaces of each coil and abutting the face of the end of the laminations, said last-named bar being of insulating material.

EDWIN E. TURNER, JR.